(12) United States Patent
Saitoh

(10) Patent No.: US 6,853,506 B2
(45) Date of Patent: Feb. 8, 2005

(54) OPTICAL AXIS ADJUSTING DEVICE

(75) Inventor: Noboru Saitoh, Saitama (JP)

(73) Assignee: PENTAX Corporation, Tokyo (JP)

( * ) Notice: Subject to any disclaimer, the term of this patent is extended or adjusted under 35 U.S.C. 154(b) by 95 days.

(21) Appl. No.: 10/226,308

(22) Filed: Aug. 23, 2002

(65) Prior Publication Data

US 2003/0043477 A1 Mar. 6, 2003

(30) Foreign Application Priority Data

Aug. 28, 2001 (JP) .......................................... 2001-257386

(51) Int. Cl.$^7$ ............................................... G02B 7/02
(52) U.S. Cl. ........................ 359/822; 359/694; 359/823; 359/819
(58) Field of Search ................................. 359/822, 694, 359/811, 819, 823, 813

(56) References Cited

U.S. PATENT DOCUMENTS

| | | | | |
|---|---|---|---|---|
| 4,652,227 A | * | 3/1987 | Aoki ........................... | 425/191 |
| 5,086,312 A | * | 2/1992 | Tanaka et al. ................. | 396/75 |
| 5,099,263 A | * | 3/1992 | Matsumoto et al. .......... | 396/75 |
| 5,625,487 A | * | 4/1997 | Hasushita et al. ........... | 359/432 |
| 6,353,203 B1 | * | 3/2002 | Hokodate et al. ...... | 219/121.67 |

FOREIGN PATENT DOCUMENTS

| | | |
|---|---|---|
| JP | 01-13388 | 1/2001 |
| JP | 01-27723 | 1/2001 |

OTHER PUBLICATIONS

English Language Translation for JP Appln. No. 2001–1388.
English Language Translation for JP Appln. No. 2001–27723.

* cited by examiner

Primary Examiner—Ricky Mack
Assistant Examiner—Brandi Thomas
(74) Attorney, Agent, or Firm—Greenblum & Bernstein, P.L.C.

(57) ABSTRACT

An optical axis adjusting device for adjusting an eccentricity of an adjusting lens group of the lens system with respect to a fixed lens group of the lens system, by moving the adjusting lens group in a direction orthogonal to an optical axis of the fixed lens group, includes an adjusting lens group support member movable in a direction orthogonal to the optical axis of the fixed lens group, and a resilient cylindrical chuck made of a resilient material which is provided with the adjusting lens group support member, the resilient cylindrical chuck having a lens holding portion which is formed at an open end of the resilient cylindrical chuck so as to surround and resiliently hold the adjusting lens group.

9 Claims, 6 Drawing Sheets

OPTICAL AXIS ADJUSTING DEVICE

BACKGROUND OF THE INVENTION

1. Field of the Invention

The present invention relates to an optical axis adjusting device which is used in an assembly procedure of an optical lens system, e.g., a photographing lens system of a digital camera.

2. Description of the Related Art

In recent years aspherical lenses have been frequently used as a lens element of a photographing lens system of a digital camera and similar optical devices due to the demand for higher resolution and miniaturization. In such a photographing lens system, it is often the case that eccentricity sensitivity of one or more lens groups or lens elements is very high. Accordingly, if the amount of eccentricity of the optical axis of the one or more lens groups or lens elements is not finely adjusted to a minimal amount, an image having a balanced contrast and which is not inclined cannot be obtained, which makes it impossible to improve the optical performance of the photographing lens system. To achieve a high optical performance in a photographing lens system, the amount of eccentricity of the optical axis is required to be within a range of a few micrometers.

To this end, the applicant of the present invention has developed an optical axis adjusting device for use in an assembly procedure of a photographing lens system. According to this optical axis adjusting device, in the assembly procedure a portion of a plurality of lens elements of the photographing lens system is treated as a fixed lens group, while the remaining portion is treated as an adjusting lens group and held by a movable holding device; the holding device is moved in a direction orthogonal to the optical axis of the fixed lens group to align the optical axis of the adjusting lens group with the optical axis of the fixed lens group. However, if the holding device only holds the adjusting lens group loosely, hysteresis occurs during movement of the adjusting lens group, and the adjusting lens group may not be able to move linearly in a worst possible case.

SUMMARY OF THE INVENTION

The present invention provides an optical axis adjusting device used in an eccentric adjustment for an optical axis of a photographing lens system of a digital camera and similar optical equipment, wherein substantially no looseness exists between a resilient chuck of the optical axis adjusting device and an adjusting lens group of the photographing lens system which is held by the resilient chuck.

For example, an optical axis adjusting device is provided, which is used in an assembly procedure of a lens system, for adjusting an eccentricity of an adjusting lens group of the lens system with respect to a fixed lens group of the lens system, by moving the adjusting lens group in a direction orthogonal to an optical axis of the fixed lens group, the optical axis adjusting device including an adjusting lens group support member movable in a direction orthogonal to the optical axis of the fixed lens group, and a resilient cylindrical chuck made of a resilient material which is provided with the adjusting lens group support member, the resilient cylindrical chuck having a lens holding portion which is formed at an open end of the resilient cylindrical chuck so as to surround and resiliently hold the adjusting lens group.

It is desirable for the optical axis adjusting device to further include a chuck opening/closing member which is positioned in the resilient cylindrical chuck, wherein a diameter of the lens holding portion varies by moving the chuck opening/closing member with respect to the resilient cylindrical chuck in an axial direction thereof.

It is desirable for the chuck opening/closing member to be formed in the shape of a cylinder, each of opposite ends of the chuck opening/closing member being formed as an open end, the optical axis adjusting device further including a positioning device for positioning the fixed lens group; an adjusting device for moving the resilient cylindrical chuck in at least one direction orthogonal to the optical axis of the fixed lens group to adjust a position of the resilient cylindrical chuck in the at least one direction; an antireflection coating formed on an inner peripheral surface of the chuck opening/closing member; a light source for emitting light toward the fixed lens group and the adjusting lens group; a transmission chart provided with at least one contrast detection pattern and positioned between the light source and one of the fixed lens group and the adjusting lens group so that the light emitted by the light source travels through the fixed lens group and the adjusting lens group via the at least one contrast detection pattern; an image pick-up device provided on the opposite side of the fixed lens group and the adjusting lens group with respect to the light source, the light emitted by the light source traveling through the at least one contrast detection pattern, the fixed lens group, the adjusting lens group and the inside of the chuck opening/closing member; a moving device for moving the image pick-up device in a direction of the optical axis of the fixed lens group; a controller for controlling an operation of the moving device so that the light which is emitted by the light source to be passed through the at least one contrast detection pattern, the fixed lens group, the adjusting lens group and the inside of the chuck opening/closing member is focused on the image pick-up device; and a processor for calculating a contrast value of an image focused on the image pick-up device via image processing.

It is desirable for the chuck opening/closing member to include a large diameter portion at one end of the chuck opening/closing member. The large diameter portion engages with the lens holding portion and expands the lens holding portion radially outwards when the chuck opening/closing member is pulled in a direction away from the resilient cylindrical chuck. The large diameter portion disengages from the lens holding portion, which causes the lens holding portion to resiliently return to an original shape thereof, when the chuck opening/closing member is pushed into the resilient cylindrical chuck.

The resilient cylindrical chuck can be moved with the adjusting device in two directions orthogonal to each other in a plane normal to the optical axis of the fixed lens group.

It is desirable for the light source, the transmission chart, the fixed lens group, the adjusting lens group, the chuck opening/closing member and the image pick-up device to be arranged in that order.

The processor and the controller can be incorporated in a CPU.

The lens system can serve as a photographing lens system of a camera.

In another embodiment, an optical axis adjusting device for adjusting an eccentricity of an adjusting lens group of a lens system with respect to a fixed lens group of the lens system is provided, the optical axis adjusting device including a resilient cylindrical chuck for resiliently holding the adjusting lens group at an open end of the resilient cylindrical chuck and an adjusting device which moves the resilient cylindrical chuck in a direction orthogonal to an optical axis of the fixed lens group to adjust the eccentricity of the adjusting lens group with respect to the fixed lens group.

The present disclosure relates to subject matter contained in Japanese Patent Application No. 2001-257386 (filed on Aug. 28, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
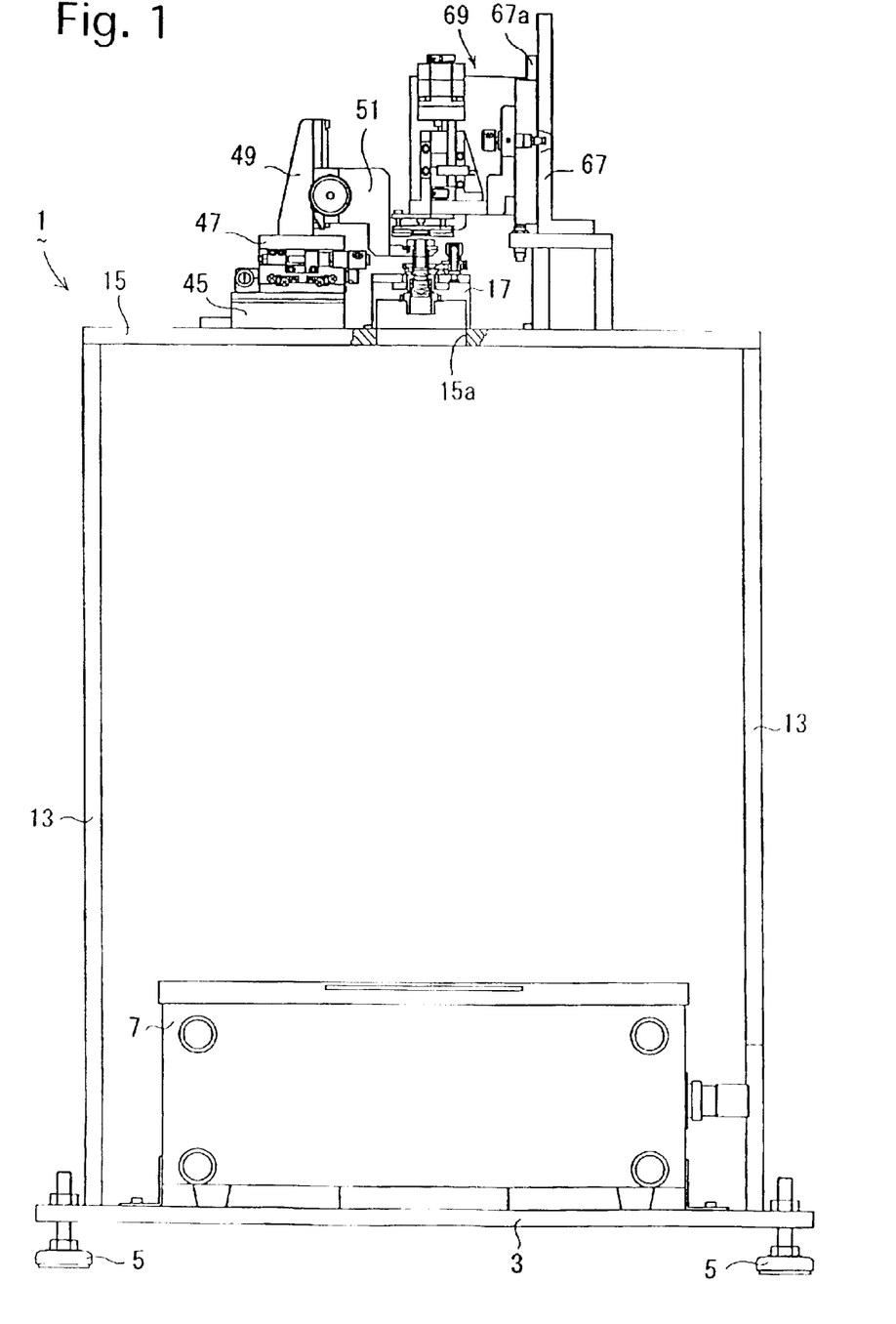
FIG. 1 is a front elevational view, partly in cross section, of an embodiment of an optical axis adjusting device according to the present invention.
Figure 7:
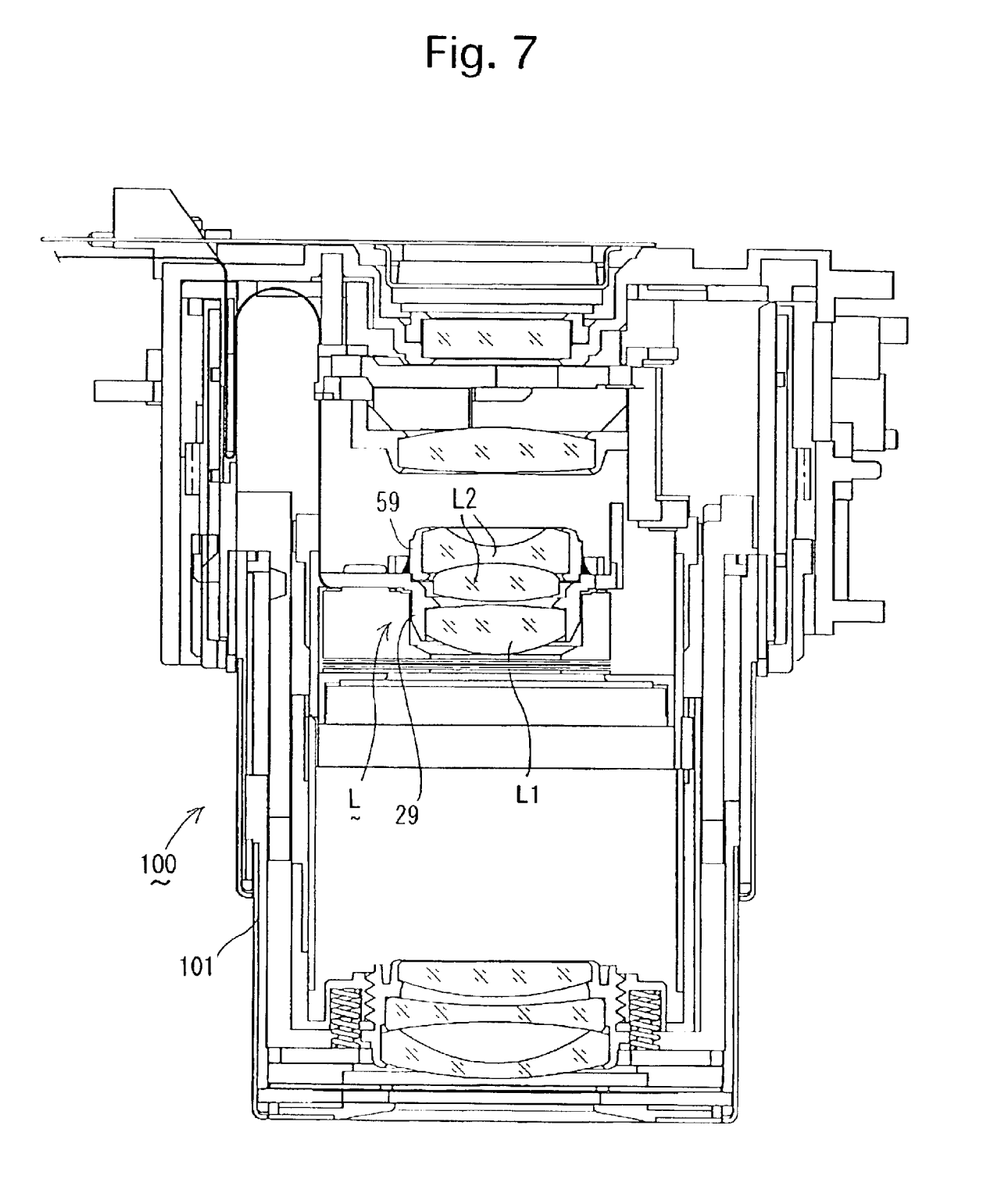
FIG. 7 is an enlarged cross sectional view of a photographing lens barrel of a digital camera which includes a second lens group that is to be adjusted with the optical axis adjusting device shown in FIG. 1.

FIG. 1 shows an overall structure of an embodiment of an optical axis adjusting device 1 according to the present invention. The optical axis adjusting device 1 is used to adjust the amount of eccentricity of the optical axis of a lens group L2 (adjusting lens group) with respect to the optical axis of a lens element L1 (fixed lens group) to a degree within a range of a few micrometers. As shown in FIG. 7, the lens element L1 and the lens group L2 constitute a second lens group L of a photographing lens barrel 101 of a digital camera 100. The lens group L2 consists of two lens elements. The eccentricity sensitivity of each of the lens element L1 and the lens group L2 is high.

As shown in FIG. 1, the optical axis adjusting device 1 is provided with a horizontal base plate 3, and is further provided at four corners of the base plate 3 with four adjustable legs 5, respectively, which are placed on the ground to generally support the optical axis adjusting device 1. The optical axis adjusting device 1 is provided on the base plate 3 with a light source box (light source) 7 in which a white lamp (not shown) is fixed. A transmission chart 9 (see FIG. 4) which is made of a translucent material is formed on top of the light source box 7.

Figure 4:
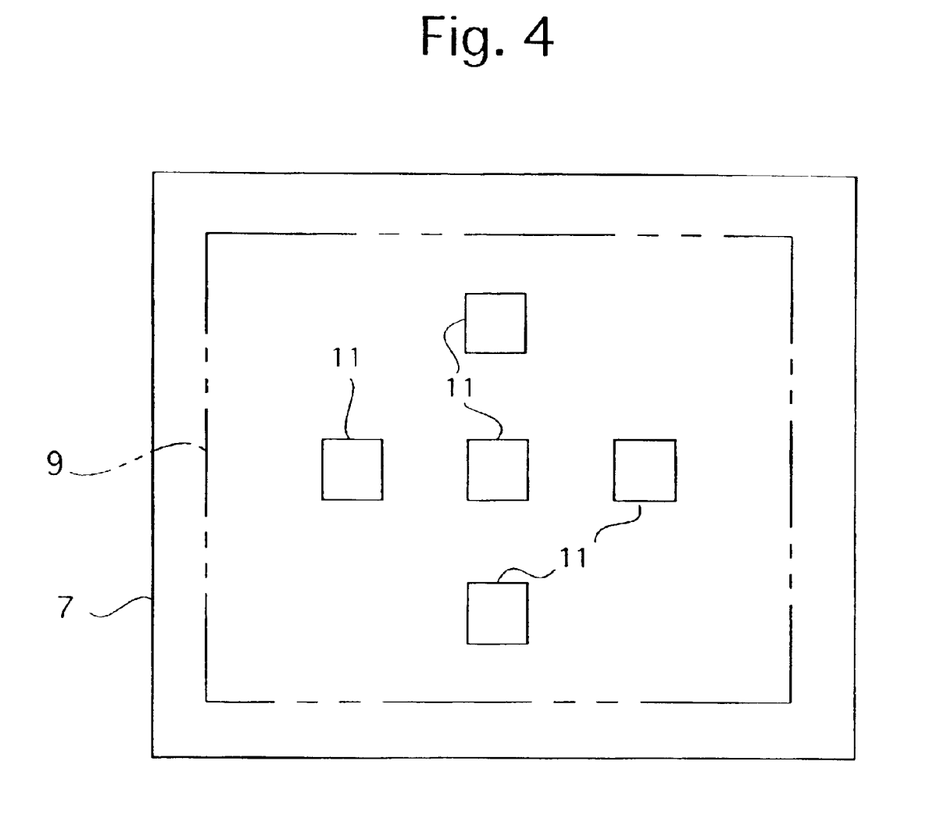
FIG. 4 is a plan view of a light source box of the optical axis adjusting device shown in FIG. 1.
Figure 5:
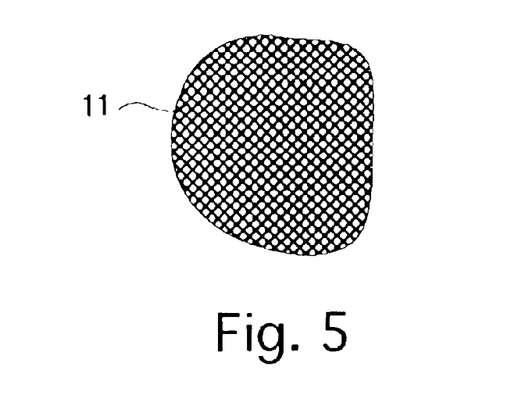
FIG. 5 is an enlarged plan view of an embodiment of a contrast detection pattern formed on a transmission chart.

As shown in FIG. 4, the transmission chart 9 is provided with five identical charts (contrast detection pattern) 11 each having a black-and-white pattern. One of the five charts 11 is positioned at the center (on an optical axis) of the transmission chart 9, two of the remaining four charts 11 are respectively positioned on front and rear sides of the central chart 11, and the remaining two charts 11 are respectively positioned on right and left sides of the central chart 11. FIG. 5 shows an embodiment of a portion of each chart 11. This embodiment of the chart 11 has a lattice pattern in which black crossing stripes are inclined to each of a front-rear direction (the vertical direction as viewed in FIG. 5) and a right-left direction (the horizontal direction as viewed in FIG. 5) by an angle of 45 degrees.

The optical axis adjusting device 1 is provided with two side walls 13 which are fixed at the right and left ends of the base plate 3 to extend vertically. The optical axis adjusting device 1 is provided at the top thereof with a horizontal mounting plate 15 which extend between the top ends of the two side walls 13.

The mounting plate 15 is provided at the center thereof with a light-collecting opening 15a. The optical axis adjusting device 1 is provided on the mounting plate 15 ' with a mount 17 mounted thereon. The mount 17 is in the shape of a substantially square bracket in cross section, and is fixed to the mounting plate 15 so that the inside of the mount 17 faces downwards to cover the light-collecting opening 15a.

Figure 3:
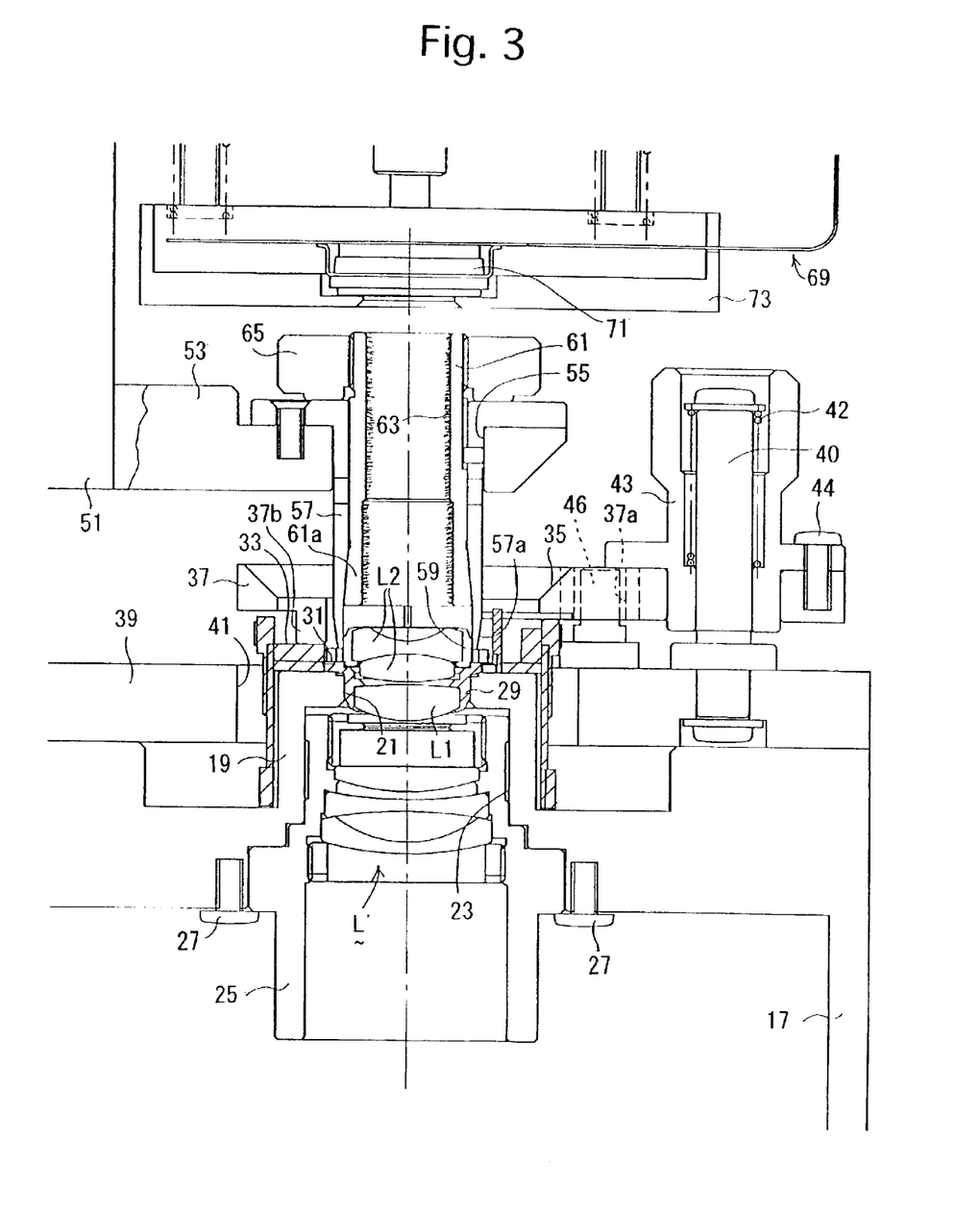
FIG. 3 is an enlarged cross sectional view of a fundamental portion of the optical axis adjusting device shown in FIG. 1.

As shown in FIG. 3, the mount 17 is provided at top center thereof with a projecting portion 19 which projects upwards. The projecting portion 19 is provided at top center thereof with a circular fixing hole 21 which serves as an element of a positioning device for positioning the lens element L1. The projecting portion 19 is hollow, and is provided therein with a fitting portion 23 with an open end at the bottom thereof. A lens frame 25 which holds a reference lens group L' is fitted in the fitting portion 23, and is fixed to the fitting portion 23 by a plurality of set screws 27 (only two of them are shown in FIG. 3).

An adjustment fixing frame 33 which serves as an element of the positioning device is fitted on top of the projecting portion 19. The adjustment fixing frame 33 is provided with a lens frame portion 29 which supports the lens element L1 of the second lens group L. The lens frame portion 29 of the adjustment fixing frame 33 is fitted in the circular fixing hole 21. The adjustment fixing frame 33 is provided above the lens frame portion 29 thereof with a stepped holding portion 31. Note that the circular fixing hole 21 and the adjustment fixing frame 33 constitute the above-mentioned positioning device.

The optical axis adjusting device 1 is provided on the mount 17 with a fixing plate 39 fixed to the mount 17. The fixing plate 39 is provided at the center thereof with an opening 41 which is formed so as not to interfere with the projecting portion 19 and the adjustment fixing frame 33. As shown in FIG. 3, a supporting shaft 40 is fixed to the fixing plate 39 to extend vertically upwards. A damper 43 is fitted on the supporting shaft 40 to be slidable thereon along the axis of the supporting shaft 40. The damper 43 for the adjustment fixing frame 33 is normally biased downwards by a helical spring 42 fitted on the supporting shaft 40. A pressure plate 37 is fixed to the damper 43 by a set screw 44. The pressure plate 37 is provided on a bottom surface thereof with an engaging hole 37a in which an engaging pin 46 projecting upwards from the fixing plate 39 is engaged.

The pressure plate 37 together with the damper 43 can freely rotate about the supporting shaft 40 and can freely move vertically along the supporting shaft 40.

The pressure plate 37 is provided, on a bottom surface thereof at equi-angular intervals (intervals of 120 degrees) about the optical axis of the lens element L1, with a set of three projections 37b which projects downwards. Only one of the three projecting portions 37b appears, in FIG. 3. Each projection 37b can be brought into pressing contact with the top surface of the adjustment fixing frame 33 by firstly raising the pressure plate 37 while rotating the pressure plate 37 against the spring force of the helical spring 42, and subsequently bringing the engaging pin 46 into engagement with the engaging hole 37a after the engaging hole 37a is positioned immediately above the engaging pin 46.

The optical axis adjusting device 1 is provided, on the mounting plate 15 on the left side of the mount 17, with an X-direction sliding table 45 which is slidable on the mounting plate 15 in an X-direction, i.e., the horizontal direction as viewed in FIG. 1. The optical axis adjusting device 1 is provided on the top surface of the X-direction sliding table 45 with an X-Y fine adjustment stage (adjusting device) 47 which can be manually moved in the X-direction and a Y-direction (a direction normal to the page of FIG. 1) by a slight amount of movement.

A pillar 49 extends upwards from the top surface of the X-Y fine adjustment stage 47. The pillar 49 is provided along the right side thereof with a guide rail 49a which extends vertically. An elevating stage 51 is engaged with the guide rail 49a to be movable upwards and downwards along the guide tail 49a manually or by motor.

Figure 2:
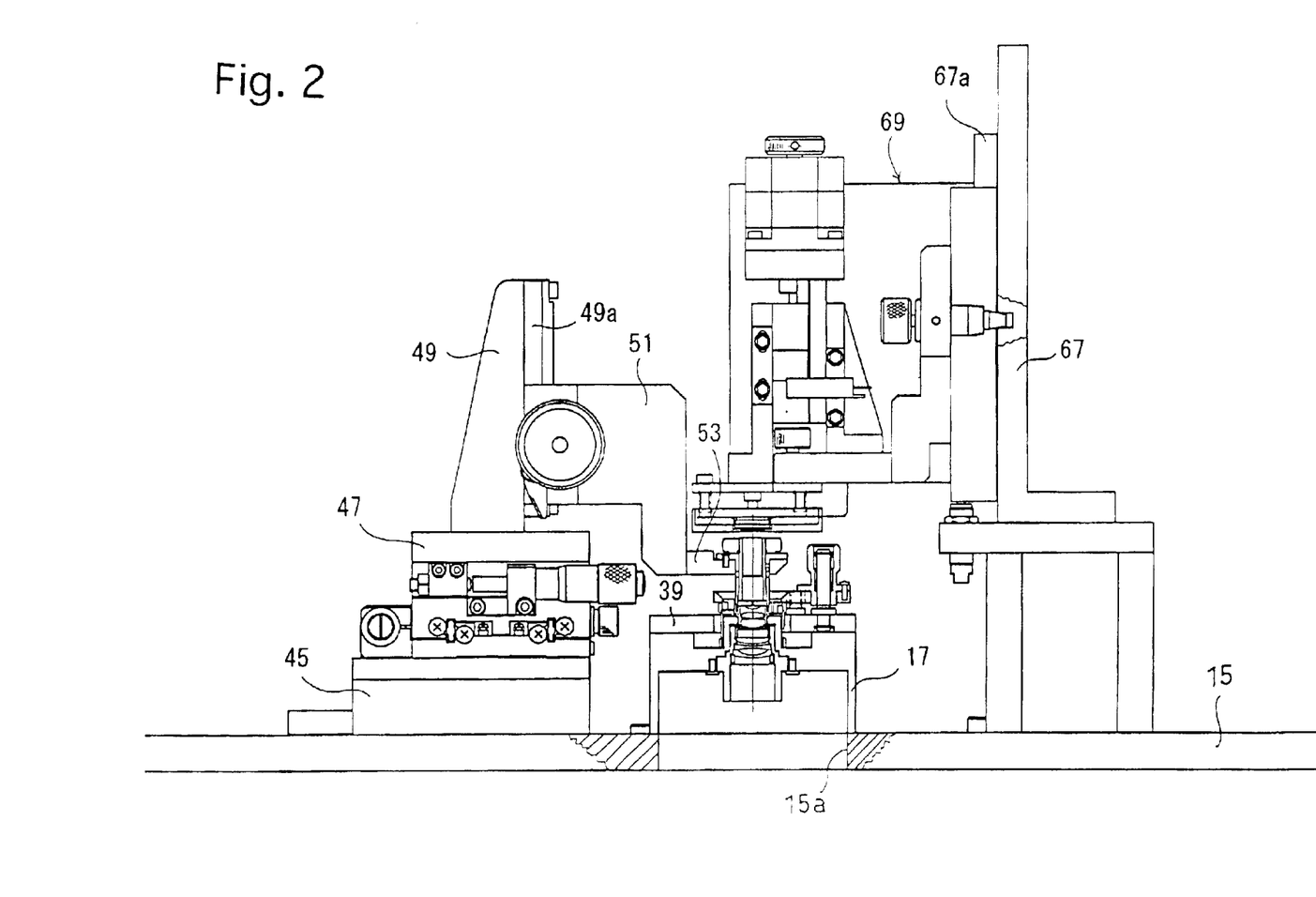
FIG. 2 is an enlarged front elevational view, partly in cross section, of a fundamental portion of the optical axis adjusting device shown in FIG. 1.

The elevating stage 51 is provided, at an end (the right end as viewed in FIG. 2) thereof directly above the mount 17, with a horizontal support member (an adjusting lens group support member) 53 on which a fitting hole 55 is formed (see FIG. 3). As shown in FIG. 3, a cylindrical collet chuck (a resilient cylindrical chuck) 57 made of a resilient material is fitted into the fitting hole 55 and fixed thereto to extend vertically downwards from the fitting hole 55. The bottom end of the collet chuck 57 is formed as an open end and serves as a lens holding portion 57a that can surround and resiliently hold an adjusting frame 59 which holds the lens group L2 of the second lens group L.

A chuck opening/closing member 61 having a cylindrical shape is fitted in the collet chuck 57. The chuck opening/closing member 61 is made of a hard material having a hardness greater than the hardness of the material of the collet chuck 57. The chuck opening/closing member 61 is provided at the bottom end thereof with a truncated conical portion (large diameter portion) 61a, the outer diameter of which increases in a direction vertically downwards (in other words, the outer diameter tapers in a direction vertically upwards from the bottom end of the chuck opening/closing member 61). The inner peripheral surface of the chuck opening/closing member 61 is coated with an antireflection coating 63.

The chuck opening/closing member 61 is provided, on an outer peripheral surface thereof at the upper end of the chuck opening/closing member 61, with a male threaded portion on which a nut 65 is screwed.

If the chuck opening/closing member 61 is pulled up from the collet chuck 57, the truncated conical portion 61a of the chuck opening/closing member is engaged with the lens holding portion 57a and expands the lens holding portion 57a of the collet chuck 57 radially outwards. On the other hand, if the chuck opening/closing member 61 is pushed down into the collet chuck 57, the truncated conical portion 61a of the chuck opening/closing member is disengaged from the lens holding portion 57a of the collet chuck 57, which causes the lens holding portion 57a to resiliently return to its original shape in radial directions to decrease the diameter of the expanded lens holding portion 57a.

If the chuck opening/closing member 61 is pushed down into the collet chuck 57 in a state where the nut 65 is positioned in an upper position on the male threaded portion of the chuck opening/closing member 61, the bottom end (the truncated conical portion 61a) of the chuck opening/closing member 61 is positioned in a lower position relative to the collet chuck 57, which makes the inner diameter of the lens holding portion 57a of the collet chuck 57 slightly smaller than the outer diameter of the adjusting frame 59 so that the collet chuck 57 can hold the adjusting frame 59.

On the other hand, if the chuck opening/closing member 61 is pushed down into the collet chuck 57 in a state where the nut 65 is positioned in a lower position on the male threaded portion of the chuck opening/closing member 61, the bottom end (the truncated conical portion 61a) of the chuck opening/closing member 61 is positioned in an upper position relative to the collet chuck 57, which makes the inner diameter of the lens holding portion 57a of the collet chuck 57 greater than the outer diameter of the adjusting frame 59.

The optical axis adjusting device 1 is provided, on the mounting plate 15 on the right side of the mount 17, with a pillar 67 which extends vertically. The pillar 67 is provided along the left side thereof with a guide rail 67a which extends vertically. An elevating member (moving device) 69 is engaged with the guide rail 67a to be movable up and down along the guide rail 67a by a motor M (see FIG. 6).

As shown in FIG. 3, a CCD holding member 73 which holds a CCD (a solid-state image pick-up device) 71 is fixed to the bottom of the elevating member 69. The CCD 71 is positioned directly above the reference lens group L'.

The motor M and the CCD 71 are electrically connected to a CPU 70 (see FIG. 6) which serves as a controller and a processor. Namely, the CPU 70 serves as a controller for controlling the overall operation (forward rotational operation, reverse rotational operation and stopping operation) of the motor M, and also serves as a processor for calculating a contrast value of an image focused on the CCD 71 via image processing. Specifically, when serving as a controller, the CPU 70 actuates the motor M to rotate forward and reverse, and subsequently stops the motor M upon determining, from the image signal transmitted from the CCD 71, that the images of the five charts 11 are properly focused on the CCD 71. When serving as a processor, the CPU 70 regularly calculates a contrast value of an image focused on the CCD 71 which varies by manually varying the position of the X-Y fine adjustment stage 47. The respective contrast values of the five charts 11 are weighted to calculate the maximum contrast value. This maximum contrast value is taken as the contrast value of the image focused on the CCD 71. An arithmetic algorithm for calculating the contrast vale is well-known in the art.

Figure 6:
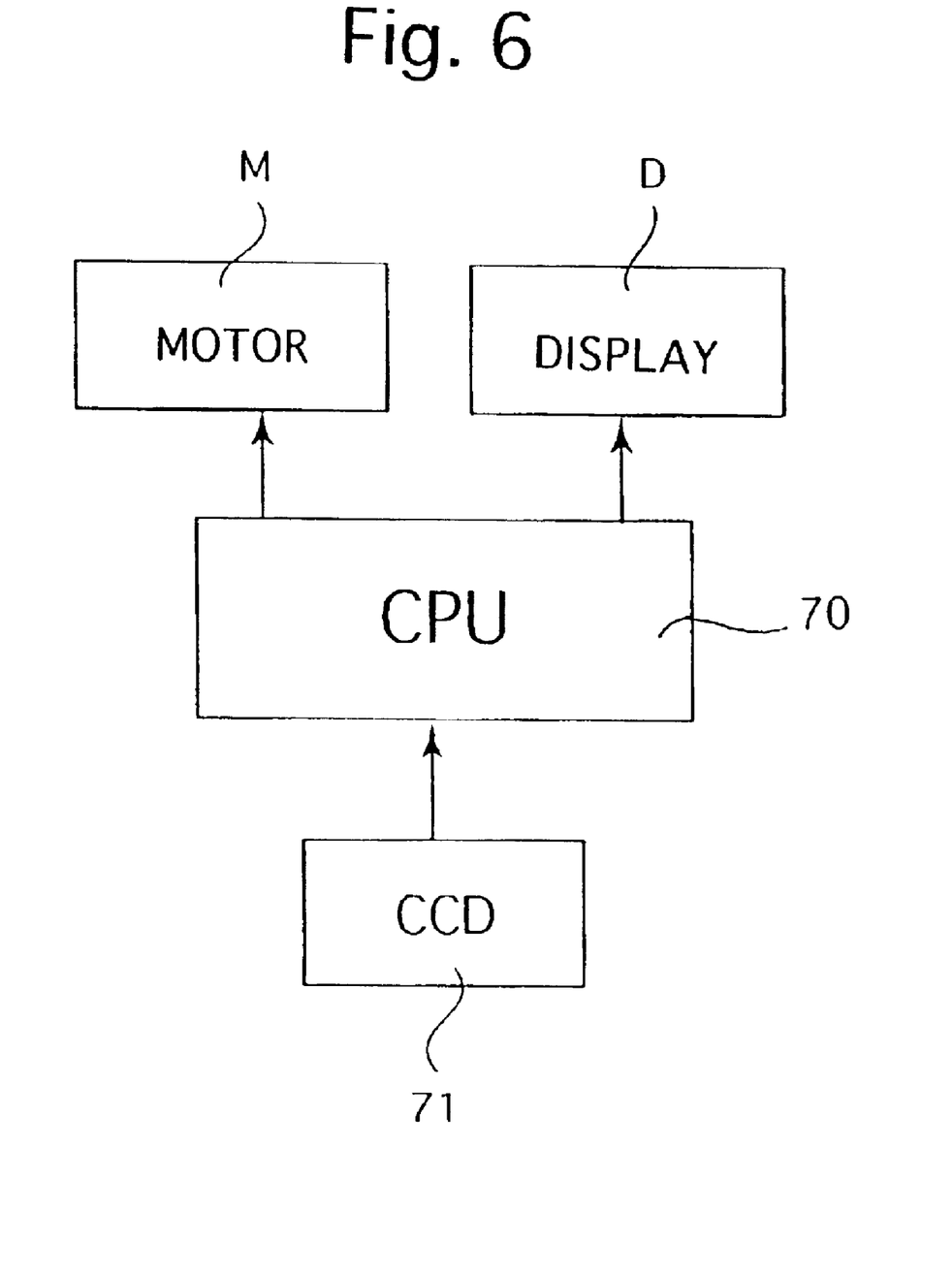
FIG. 6 is a block diagram of a CPU, a CCD, a motor and a display, showing the relationship among these elements.

A display (indication device) D for indicating the contrast value calculated by the CPU 70 is electrically connected to the CPU 70. The display D indicates the calculated contrast value at all times.

The operations for adjusting the amount of eccentricity of the optical axis of the lens group L2 with respect to the optical axis of the lens element L1 with the use of the optical axis adjusting device 1 will be hereinafter discussed.

Firstly, the adjustment fixing frame 33 is fitted on top of the projecting portion 19 so that the lens frame portion 29 of the adjustment fixing frame 33 is fitted in the circular fixing hole 21. At the same time, the adjusting frame 59 is fitted in the stepped holding portion 31 of the adjustment fixing frame 33 so that the optical axes of the lens element L1 and the lens group L2 are roughly aligned with each other.

Subsequently, the pressure plate 37 is rotated while being lifted to allow the engaging pin 46 to engage in the engaging hole 37a. Upon engagement of the engaging pin 46 in the engaging hole 37a, the three projections 37b of the pressure plate 37 which is biased downwards by the spring force of the helical spring 42 are pressed against the top surface of the adjustment fixing frame 33. This firmly fixes the adjustment fixing frame 33 to the projecting portion 19 to securely prevent the adjustment fixing frame 33 from moving in any horizontal direction.

Subsequently, in a state where the nut 65 is positioned in an upper position on the male threaded portion of the chuck opening/closing member 61, the chuck opening/closing member 61 is pushed down into the collet chuck 57 to reduce the inner diameter of the lens holding portion 57a of the collet chuck 57 to hold the adjusting frame 59 by the lens holding portion 57a.

Subsequently, the white lamp in the light source box 7 is lit up so that the light bundles which are respectively passed through the five charts 11 of the transmission chart 9 are converged onto the CCD 71 via the reference lens group L', the lens element L1, the lens group L2 and the inside of chuck opening/closing member 61. At the same time, rotation of the motor M is controlled by the CPU 70 to move the elevating member 69 so as to focus the converged light bundles on the CCD 71.

Subsequently, the operator of the optical axis adjusting device 1 manually moves the X-Y fine adjustment stage 47 in X-direction and Y-direction while looking at the display D so that the contrast value of the image focused on the CCD 71 becomes maximum. Once the contrast value becomes maximum, the operator stops moving the X-Y fine adjustment stage 47.

When the contrast value of the image focused on the CCD 71 becomes maximum, the amount of eccentricity of the optical axis of the lens group L2 with respect to the optical axis of the lens element L1 is considered within a range of a few micrometers. In this state, the adjustment fixing frame 33 and the adjusting frame 59 are bonded to each other by an adhesive (not shown).

After the adjustment fixing frame 33 and the adjusting frame 59 are securely bonded to each other, the chuck opening/closing member 61 is pulled up from the collet chuck 57 to increase the diameter of the lens holding portion 57a of the collet chuck 57 to release the adjusting frame 59 therefrom. At the same time, the elevating member 69 is moved up while the elevating stage 51 is moved up to pull up the collet chuck 57.

Subsequently, the pressure plate 37 is moved up vertically along the supporting shaft 40 so that the engaging pin 46 is disengaged from the engaging hole 37a. Subsequently, the pressure plate 37 is rotated about the supporting shaft 40 to move the pressure plate 37 away from the top surface of the adjustment fixing frame 33. Finally, the adjustment fixing frame 33 and the adjusting frame 59 which have been bonded to each other are removed from the circular fixing hole 21 of the projecting portion 19.

As can be understood from the above description, according to the above illustrated embodiment of the optical axis adjusting device, the amount of eccentricity of the optical axis of the lens group L2 with respect to the optical axis of the lens element L1 can be adjusted to a degree within a range of a few micrometers. Accordingly, an image having a balanced contrast and which is not inclined can be obtained even if the lens element L1 and the lens group L2 each having a high eccentricity sensitivity are used as elements of the photographing lens system L of the digital camera 100. Consequently, the optical performance of the photographing lens system is improved.

The lens holding portion 57a can firmly hold the adjusting frame 59 without being loose due to the lens holding portion 57a being resilient. As a result, no hysteresis occurs during movement of the adjusting frame 59, and the adjusting frame 59 can be moved linearly and minutely.

In addition, the lens holding portion 57a can firmly hold different types of adjusting frames having different diameters without being loose.

Furthermore, the contrast of the image focused on the CCD 71 is further sharpened due to the antireflection coating 63 that is coated on the inner peripheral surface of the chuck opening/closing member 61. This ensures the determination of whether the contrast value of the image focused on the CCD 71 is at a maximum.

Although the present invention is applied to the optical axis adjusting device 1 that is used to adjust eccentricity of an optical axis in the photographing lens system L of the digital camera 100 in the above description, the present invention can also be applied to another optical axis adjusting device used to adjust eccentricity of an optical axis in a photographing lens system of a conventional camera using sensitive film such as 35 mm film.

In the above illustrated embodiment of the optical axis adjusting device, the X-Y fine adjustment stage 47 can be moved in X-direction and Y-direction by respective motors (not shown) which are electrically connected to the CPU 70. In this case, the motors can be stopped by control of the CPU 70 immediately after the contrast value becomes maximum.

As can be understood from the foregoing, the present invention can provide an optical axis adjusting device used in an eccentric adjustment for the optical axis of the photographing lens system of a digital camera and similar optical equipment, wherein substantially no looseness exists between a resilient chuck of the optical axis adjusting device and an adjusting lens group of the photographing lens system which is held by the resilient chuck.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An optical axis adjusting device, used in an assembly procedure of a lens system, for adjusting an eccentricity of an adjusting lens group of said lens system with respect to a fixed lens group of said lens system, by moving said adjusting lens group in a direction orthogonal to an optical axis of said fixed lens group, said optical axis adjusting device comprising:
   an adjusting lens group support member movable in a direction orthogonal to said optical axis of said fixed lens group; and
   a resilient cylindrical chuck made of a resilient material which is provided with said adjusting lens group support member, said resilient cylindrical chuck having a lens holding portion which is formed at an open end of said resilient cylindrical chuck so as to surround and resiliently hold said adjusting lens group.

2. The optical axis adjusting device according to claim 1, further comprising a chuck opening/closing member which is positioned in said resilient cylindrical chuck, wherein a diameter of said lens holding portion varies by moving said chuck opening/closing member with respect to said resilient cylindrical chuck in an axial direction thereof.

3. The optical axis adjusting device according to claim 2, wherein said chuck opening/closing member is formed in the shape of a cylinder, each of opposite ends of said chuck opening/closing member being formed as an open end, said optical axis adjusting device further comprising:

a positioning device for positioning said fixed lens group;

an adjusting device for moving said resilient cylindrical chuck in at least one direction orthogonal to said optical axis of said fixed lens group to adjust a position of said resilient cylindrical chuck in said at least one direction;

an antireflection coating formed on an inner peripheral surface of said chuck opening/closing member;

a light source for emitting light toward said fixed lens group and said adjusting lens group;

a transmission chart provided with at least one contrast detection pattern and positioned between said light source and one of said fixed lens group and said adjusting lens group so that said light emitted by said light source travels through said fixed lens group and said adjusting lens group via said at least one contrast detection pattern;

an image pick-up device provided on the opposite side of said fixed lens group and said adjusting lens group with respect to said light source, said light emitted by said light source traveling through said at least one contrast detection pattern, said fixed lens group, said adjusting lens group and the inside of said chuck opening/closing member;

a moving device for moving said image pick-up device in a direction of said optical axis of said fixed lens group;

a controller for controlling an operation of said moving device so that said light which is emitted by said light source to be passed through said at least one contrast detection pattern, said fixed lens group, said adjusting lens group and said inside of said chuck opening/closing member is focused on said image pick-up device; and a processor for calculating a contrast value of an image focused on said image pick-up device via image processing.

4. The optical axis adjusting device according to claim 1, wherein said chuck opening/closing member comprises a large diameter portion at one end of said chuck opening/closing member;

wherein said large diameter portion engages with said lens holding portion and expands said lens holding portion radially outwards when said chuck opening/closing member is pulled in a direction away from said resilient cylindrical chuck; and wherein said large diameter portion disengages from said lens holding portion, which causes said lens holding portion to resiliently return to an original shape thereof, when said chuck opening/closing member is pushed into said resilient cylindrical chuck.

5. The optical axis adjusting device according to claim 3, wherein said resilient cylindrical chuck can be moved with said adjusting device in two directions orthogonal to each other in a plane normal to said optical axis of said fixed lens group.

6. The optical axis adjusting device according to claim 3, wherein said light source, said transmission chart, said fixed lens group, said adjusting lens group, said chuck opening/closing member and said image pick-up device are arranged in that order.

7. The optical axis adjusting device according to claim 3, wherein said processor and said controller are incorporated in a CPU.

8. The optical axis adjusting device according to claim 1, wherein said lens system serves as a photographing lens system of a camera.

9. An optical axis adjusting device for adjusting an eccentricity of an adjusting lens group of a lens system with respect to a fixed lens group of said lens system, said optical axis adjusting device comprising:

a resilient cylindrical chuck for resiliently holding said adjusting lens group at an open end of said resilient cylindrical chuck; and an adjusting device which moves said resilient cylindrical chuck in a direction orthogonal to an optical axis of said fixed lens group to adjust said eccentricity of said adjusting lens group with respect to said fixed lens group.

* * * * *